Figure 1:
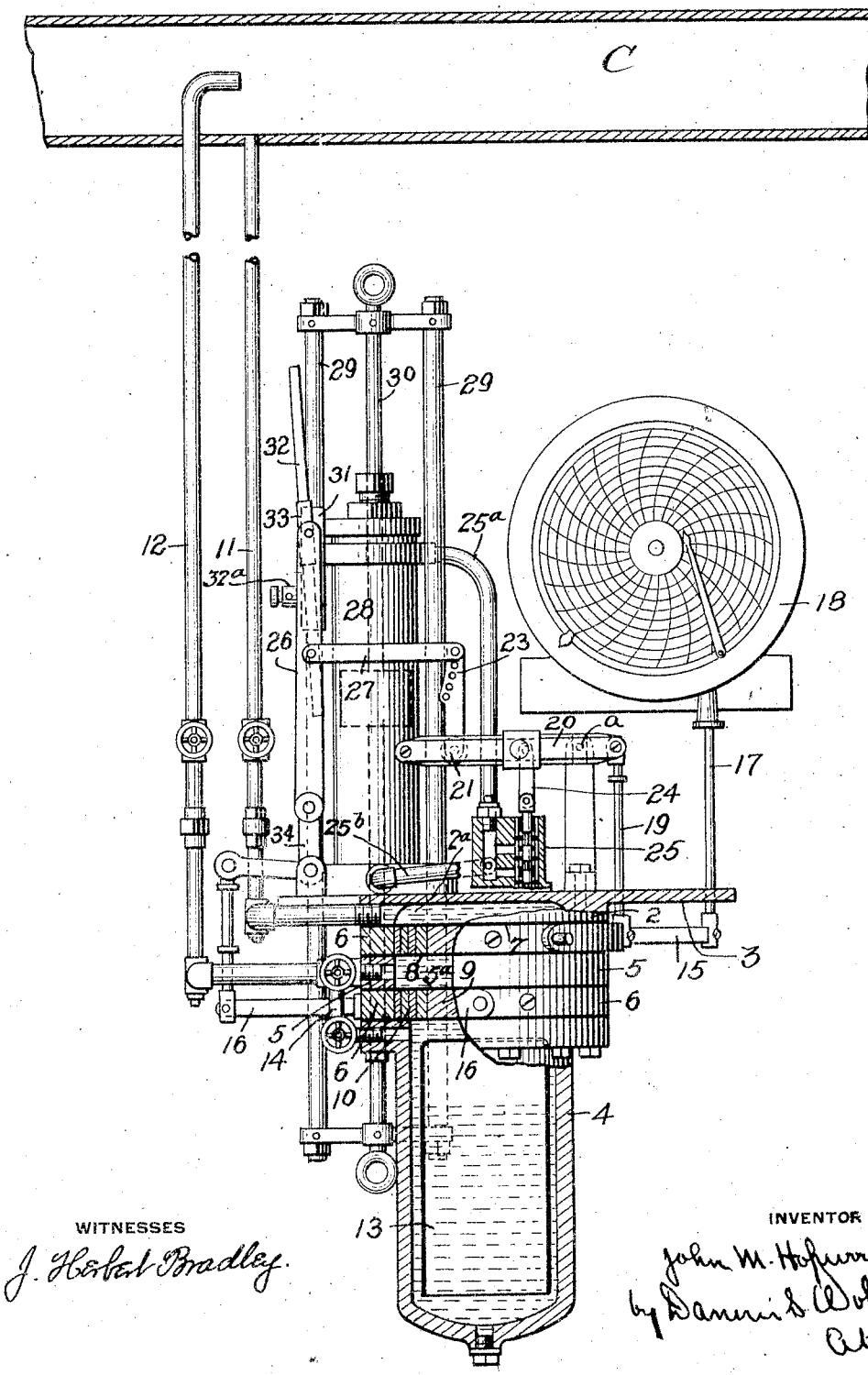

J. M. HOPWOOD.
REGULATING MECHANISM.
APPLICATION FILED APR. 26, 1919.

1,338,929.

Patented May 4, 1920.
2 SHEETS—SHEET 1.

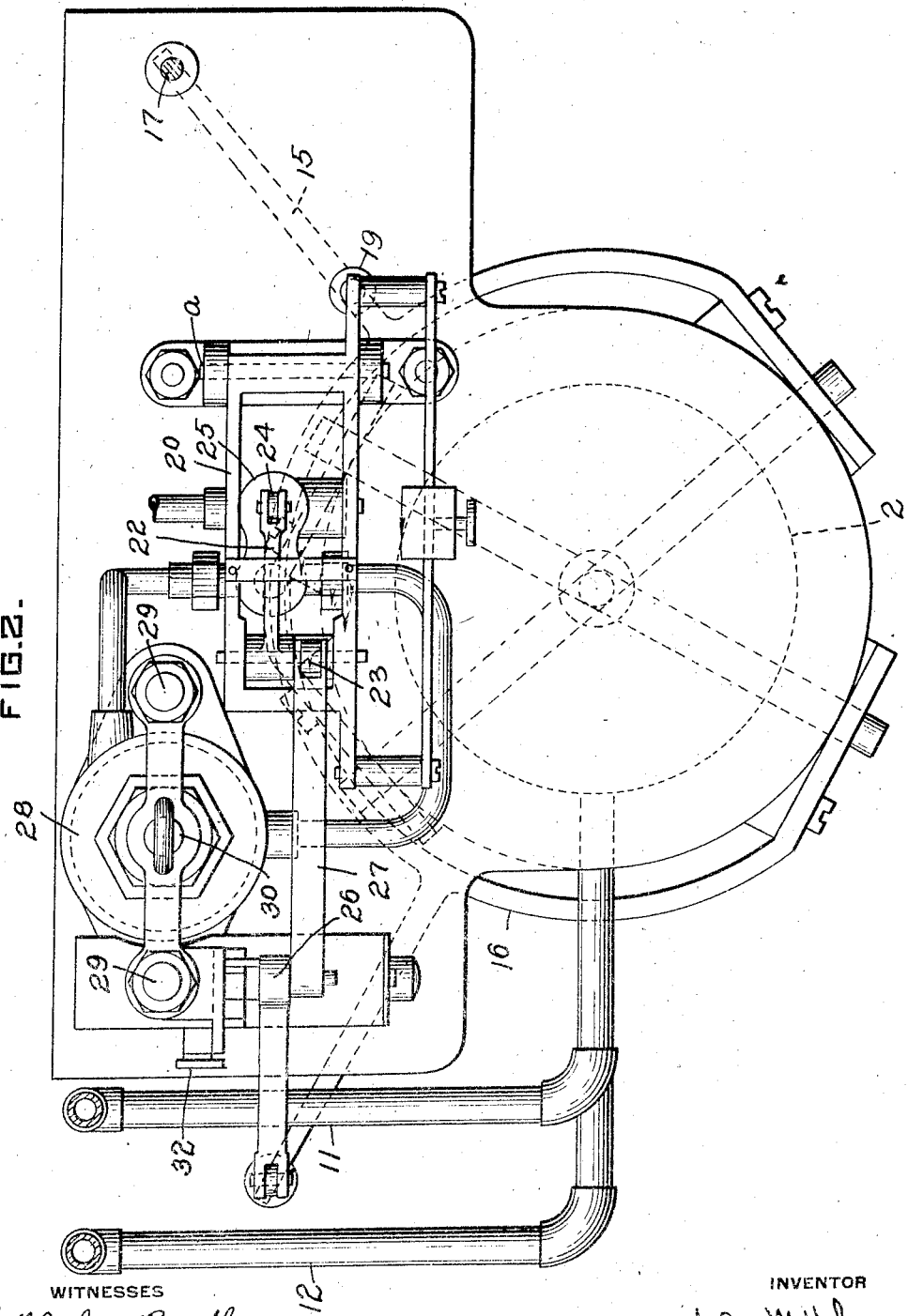

UNITED STATES PATENT OFFICE.

JOHN M. HOPWOOD, OF DORMONT, PENNSYLVANIA.

REGULATING MECHANISM.

1,338,929.

Specification of Letters Patent.  Patented May 4, 1920.

Application filed April 26, 1919. Serial No. 292,938.

*To all whom it may concern:*

Be it known that I, JOHN M. HOPWOOD, residing at Dormont, in the county of Allegheny and State of Pennsylvania, a citizen of the United States, have invented or discovered certain new and useful Improvements in Regulating Mechanism, of which improvements the following is a specification.

Heretofore controlling mechanism or regulating mechanism of the type to which the invention described herein pertains, was operative by and in accordance with the pressure of a fluid, or by and in accordance with changes in the difference between the static and dynamic pressure of a fluid flowing through a pipe or conduit, and hence neither of them have been capable of fully meeting all the conditions required in controlling or regulating mechanism employed in connection with the flow of fluids under pressure.

The invention described herein has for its object a construction for controlling or regulating mechanism operative not only by and in accordance with changes in the pressure of fluid but also by and in accordance with changes in the rate of flow of a fluid under pressure. The invention is hereinafter more fully described and claimed.

In the accompanying drawings forming a part of this specification, Figure 1 is a view partly in elevation and partly in section of my improved regulating mechanism, and Fig. 2 is a top plan view of the same.

In the practice of the invention, two diaphragms are arranged intermediate a cap piece 2 preferably formed integral with the bed plate 3 of the mechanism, and a shell 4, the diaphragms being spaced a suitable distance apart by an annulus 5. Each diaphragm preferably consists of a ring 6 arranged between flexible members 7 and 8 and a central transmitting block 9 and a series of rings 10 arranged between the block and the spacing rings 6, as described and claimed in Letters Patent No. 1,094,116, dated April 21st, 1914, to Francis H. Brown. The chamber 2ª above the upper diaphragm is so connected by a pipe 11 to a fluid conducting pipe or conduit C that the upper side of the diaphragm will be subjected to static pressure modified by the dynamic pressure of the stream flowing along the conduit, while the chamber 5ª intermediate the diaphragms is so connected by a pipe 12 to the pipe or conduit C that a pressure equal to and varying with the static pressure of the fluid in the pipe or conduit will be maintained therein. The underside of the lower diaphragm is subjected to a constant pressure substantially equal to the normal static pressure of the fluid in the pipe or conduit. This pressure is applied through a fluid cushion formed in the shell 4 in which is placed an inverted cup 13 and the shell filled with a suitable liquid. In charging the shell with liquid, air will be entrapped in the cup, thereby forming a resilient cushion operative on the underside of the lower diaphragm. In order that the desired pressure may be established in the shell, the pipe 12 which is in communication, as shown in Fig. 1, with the fluid conducting pipe C, is connected by a valved branch pipe 14 to the interior of the shell. As soon as the desired pressure has been established in the shell, the valve of the branch 14 is closed so that thereafter the underside of the lower diaphragm will be subjected to a constant but yielding pressure substantially equal to the normal pressure in the conduit. The (blocks 9) of the diaphragms are operatively connected to the respective levers 15 and 16, as shown and described in the patent above referred to.

As in the construction described, the upper diaphragm is subjected on both sides to the same static pressure as in the pipe or conduit C; any changes in such pressure will not have any effect thereon, but as the pressure on the upper side is the static pressure plus or minus the dynamic pressure dependent on the arrangement of the Pitot tube in the pipe C, any change in the rate of flow of the fluid in the pipe C will cause an incremental movement of the diaphragm proportional to such change in flow. Hence by connecting the lever 15 by a rod 17 to a suitable indicating and recording mechanism 18, an efficient flow meter is formed.

The lever 15 is connected by a rod 19 to a frame 20 pivotally mounted at *a* and in the frame is mounted a shaft 21 provided with arms 22 and 23. The arm 22 extends toward the pivotal point of the frame and is connected to a stem 24 of the movable member of the valve mechanism 25, preferably of the construction shown in cross section to the right in Fig. 1, and fully shown and described in Patent No. 1,098,935, dated June 2, 1914, to Francis H. Brown. The arm is connected at a point adjacent its upper end to a swinging member 26 by a link 27 so that when the frame 20 is rocked the arm 22 will be moved with it, thereby shifting the valve to admit steam to the upper or lower end of a cylinder 28 to raise or lower the piston of such cylinder and with it the frame 29 connected at its opposite ends by cross bars to the piston rod 30, said cylinder being connected to the valve mechanism 25 by pipes 25ᵃ and 25ᵇ. On the frame is secured a block 31 on which is adjustably mounted a bar 32 which can be shifted by suitable mechanism as the screw 32ᵃ to any desired angle with the axis of the cylinder 30. On this rod is slidably mounted a shoe 33 pivotally connected to the upper end of the swinging member 26 which is pivotally mounted at its lower end. When, by the shifting of the movable member of the valve mechanism 25, the frame 20 is moved up or down, the rod 32 will be caused to slide along the shoe and thereby shift the upper end of the swinging member 26 an amount proportional to the angle of the rod or bar 32 to the axis of the cylinder. By this movement of the swinging member, the arm 23 is shifted and by it the arm 22, in a direction opposite to that of the previous movement of the frame 20, thereby closing the valve without any movement of the frame. This operation is repeated, i. e., the valve 25 opened in one direction or the other by a movement of the upper diaphragm due to variations in the rate of flow and by a partial movement of the piston 30 of cylinder 28 following such opening of the valve 25, the valve is again closed by the movement of the swinging member 26. As the pressure in the pipe C changes, a corresponding change will be produced in the chamber intermediate the diaphragm as well as in the chamber above the upper diaphragm, but if there has been no change in flow, the changes of static pressure will not have effect on the upper diaphragm. A change of static pressure in the intermediate chamber, as for example, a drop in pressure in the intermediate chamber, will permit the constant pressure below the lower diaphragm to operate to raise the latter. This movement of the diaphragm will shift the outer end of the lever 16 downwardly and thereby shift the bell crank lever 34 so as to throw the arm to which the lower end of the swinging member 26 is pivoted, inwardly; this movement of the swinging member will shift the arms 22 and 23 so as to operate the movable member of the valve mechanism 25 to so admit steam to the cylinder as to cause a movement of the frame 29. In case the pressure in the intermediate chamber should exceed that of the fluid cushion in the shell 13, the lower end of the swinging member 26 will be moved outwardly, thereby causing reverse movement of the pilot valve. It will be understood that where the pilot valve is shifted by a movement of the frame 20 or the bell crank lever 34, there will be a compensating movement for closing such valve on a small or incremental movement of the piston in cylinder 30.

I claim herein as my invention:

1. A regulating or controlling mechanism having in combination two diaphragms, a fluid pressure cushion operative on one side of one of two diaphragms, a fluid pressure cylinder and piston, and a valve mechanism controlling the flow of fluid pressure to said cylinder and operative by both of the diaphragms.

2. A regulating or controlling mechanism having in combination two diaphragms, fluid pressure cushion operative on one side of one of the diaphragms, a fluid pressure cylinder and piston, a valve mechanism for controlling the flow of fluid under pressure to said cylinder, and operative by said diaphragms and means for closing said valve mechanism on a predetermined movement of the piston.

3. A regulating or controlling mechanism having in combination two diaphragms, a fluid pressure cushion operative on one side of one of the diaphragms, a cylinder and piston, a valve mechanism for controlling the flow of fluid under pressure to the cylinder and operative by one of the diaphragms, a mechanism operative by the piston of the cylinder and embodying a swinging member connected to the valve mechanism and connection from said swinging member to the second diaphragm.

4. A regulating or controlling mechanism having in combination two independently movable diaphragms, one diaphragm operative by and in accordance with changes in the dynamic pressure of a stream of fluid under pressure, the second diaphragm operative by and in accordance with changes in the static pressure of such fluid, and mechanism operative by both diaphragms.

5. A regulating or controlling mechanism having in combination a diaphragm operative by and in accordance with changes in the dynamic pressure of a stream of fluid under pressure, a second diaphragm operative by and in accordance with changes in the static pressure of such fluid, mechanism operative by both diaphragms and means operative by such mechanism for controlling the movement of the latter.

6. A regulating or controlling mechanism having in combination two diaphragms forming between them a chamber whereby adjacent faces of the diaphragms may be subjected to the static component of the total pressure of a stream of fluid under pressure, means for maintaining on the outer face of one of the diaphragms a pressure substantially equal to the normal static pressure of such fluid, means whereby the outer face of the other diaphragm will be subjected to changes in the dynamic pressure of such stream of fluid under pressure and mechanism operative by both diaphragms.

In testimony whereof I have hereunto set my hand.

JOHN M. HOPWOOD.